(12) United States Patent
Shurtleff

(10) Patent No.: US 10,851,511 B2
(45) Date of Patent: Dec. 1, 2020

(54) MOBILE MICROALGAE HARVESTING

(71) Applicant: Utah Valley University, Orem, UT (US)

(72) Inventor: Kevin Shurtleff, Orem, UT (US)

(73) Assignee: Utah Valley University, Orem, UT (US)

( * ) Notice: Subject to any disclaimer, the term of this patent is extended or adjusted under 35 U.S.C. 154(b) by 32 days.

(21) Appl. No.: 16/119,396

(22) Filed: Aug. 31, 2018

(65) Prior Publication Data

US 2019/0063027 A1 Feb. 28, 2019

Related U.S. Application Data

(60) Provisional application No. 62/605,865, filed on Aug. 31, 2017.

(51) Int. Cl.
*E02B 15/10* (2006.01)
*A01D 44/00* (2006.01)
(Continued)

(52) U.S. Cl.
CPC .............. *E02B 15/10* (2013.01); *A01D 44/00* (2013.01); *B01D 24/007* (2013.01); *B01D 24/12* (2013.01); *B01D 24/461* (2013.01); *B01D 25/12* (2013.01); *B01D 25/38* (2013.01); *B01D 37/02* (2013.01); *B01D 39/18* (2013.01); *B01D 39/20* (2013.01); *C02F 1/004* (2013.01); *C02F 1/40* (2013.01); *C10L 1/02* (2013.01); *E02B 15/048* (2013.01); *B01D 2101/04* (2013.01); *B63B 35/32* (2013.01); *C02F 2101/30* (2013.01);
(Continued)

(58) Field of Classification Search
CPC ...... E02B 15/045; E02B 15/048; E02B 15/10; E02B 15/106; A01D 44/00; B01D 25/12
USPC ...... 210/170.05, 170.09, 170.11, 224, 242.1, 210/776; 56/8.9
See application file for complete search history.

(56) References Cited

U.S. PATENT DOCUMENTS 3,578,171 A * 5/1971 Usher .................. E02B 15/106
210/776
3,730,346 A * 5/1973 Prewitt ................ E02B 15/106
210/776

(Continued)

OTHER PUBLICATIONS

Hengda Filter Press, https://hengdafilterpress.com/, visited Dec. 12, 2018.

*Primary Examiner* — Christopher Upton
(74) *Attorney, Agent, or Firm* — Kunzler Bean & Adamson; Bruce R. Needham

(57) ABSTRACT

A mobile microalgae harvesting apparatus is disclosed. In one embodiment the mobile microalgae harvesting apparatus includes a harvesting boom coupled to a harvesting vessel, where the harvesting boom skims a microalgae mixture of microalgae and water from a surface of a body of water down to a predetermined depth below the surface. In the embodiment, the mobile microalgae harvesting apparatus also includes a separator aboard the harvesting vessel that separates water from the microalgae mixture and a microalgae collector that collects microalgae from the separator, wherein the microalgae collector deposits the collected microalgae on a transfer vessel coupled to the harvesting vessel. A mobile microalgae harvester and a system for harvesting microalgae are also disclosed.

16 Claims, 9 Drawing Sheets

(51) Int. Cl.
<table>
<tr><td>C02F 1/40</td><td>(2006.01)</td></tr>
<tr><td>C02F 1/00</td><td>(2006.01)</td></tr>
<tr><td>B01D 39/18</td><td>(2006.01)</td></tr>
<tr><td>B01D 25/12</td><td>(2006.01)</td></tr>
<tr><td>B01D 24/00</td><td>(2006.01)</td></tr>
<tr><td>B01D 25/38</td><td>(2006.01)</td></tr>
<tr><td>B01D 24/46</td><td>(2006.01)</td></tr>
<tr><td>B01D 39/20</td><td>(2006.01)</td></tr>
<tr><td>B01D 37/02</td><td>(2006.01)</td></tr>
<tr><td>B01D 24/12</td><td>(2006.01)</td></tr>
<tr><td>C10L 1/02</td><td>(2006.01)</td></tr>
<tr><td>E02B 15/04</td><td>(2006.01)</td></tr>
<tr><td>B63B 35/32</td><td>(2006.01)</td></tr>
<tr><td>C02F 101/30</td><td>(2006.01)</td></tr>
<tr><td>C02F 103/00</td><td>(2006.01)</td></tr>
<tr><td>C02F 103/08</td><td>(2006.01)</td></tr>
</table>

(52) U.S. Cl.
CPC .... *C02F 2103/007* (2013.01); *C02F 2103/08* (2013.01); *C02F 2201/008* (2013.01); *C02F 2303/16* (2013.01); *C10L 2200/0469* (2013.01); *E02B 15/106* (2013.01)

(56) References Cited

U.S. PATENT DOCUMENTS

| | | | |
|---|---|---|---|
| 3,847,816 A * | 11/1974 | DiPerna | E02B 15/046 210/776 |
| 5,011,604 A * | 4/1991 | Wilde | C02F 3/32 210/170.09 |
| 5,154,835 A * | 10/1992 | DeMichael | E02B 15/106 210/776 |
| 5,275,097 A * | 1/1994 | Wettlaufer | B01D 25/12 100/113 |
| 2011/0203999 A1* | 8/2011 | Simpson | B01D 25/12 210/179 |
| 2011/0297597 A1* | 12/2011 | Di Bella | E02B 15/045 210/170.05 |
| 2015/0292174 A1* | 10/2015 | Hong | C02F 1/001 210/170.05 |

* cited by examiner

MOBILE MICROALGAE HARVESTING

CROSS-REFERENCES TO RELATED APPLICATIONS

This application claims priority to U.S. Provisional Patent Application No. 62/605,865 entitled DIRECT MICROALGAE HARVESTING TECHNOLOGY and filed on Aug. 31, 2017 for Kevin Shurtleff which is incorporated herein by reference.

FIELD OF THE INVENTION

This invention relates to systems for collecting environmental pollutants from open water and more particularly for harvesting hazardous microalgae for use as a renewable biomass fuel.

BACKGROUND

Hazardous algal blooms (HABs) are a serious environmental issue worldwide. HABs occur when water conditions (temperature, solar insolation, nutrients) foster rapid growth of cyanobacteria (blue green algae). When cyanobacteria reach high concentrations, incoming sunlight is blocked, preventing photosynthesis. However, existing systems for collecting algae from a body of water are designed to collect macroalgae and are inadequate to collect microalgae e.g. cyanobacteria. Moreover, various existing filtering systems for separating contaminants from liquid are designed for removal of the contaminants and may introduce additional materials to the contaminants that may render the collected contaminants unsuitable for biomass energy production.

SUMMARY

A mobile microalgae harvesting apparatus is disclosed. In one embodiment the mobile microalgae harvesting apparatus includes a harvesting boom coupled to a harvesting vessel, where the harvesting boom skims a microalgae mixture of microalgae and water from a surface of a body of water down to a predetermined depth below the surface. The mobile microalgae harvesting apparatus also includes a separator aboard the harvesting vessel that separates water from the microalgae mixture and a microalgae collector that collects microalgae from the separator. The microalgae collector deposits the collected microalgae on a transfer vessel coupled to the harvesting vessel.

A mobile microalgae harvester is also disclosed. The mobile microalgae harvester includes a harvesting boom coupled to a harvesting boat, where the harvesting boom skims a microalgae mixture of microalgae and water from a surface of a body of water down to a predetermined depth below the surface. The mobile microalgae harvester also includes a filter aid assembly that combines a combustible filter aid with the microalgae mixture. In the embodiment, the mobile microalgae harvester includes one or more filter assemblies aboard the harvesting boat, where each of the one or more filter assemblies includes a filter and one or more scrapers that scrape a combustible biomass in the form of combined combustible filter aid and microalgae from a surface of the filter. The mobile microalgae harvester also includes a microalgae collector that collects the combustible biomass from the one or more filter assemblies and accumulates the combustible biomass on the harvesting boat. The microalgae collector is configured to transfer the accumulated combustible biomass to a transfer boat while the transfer boat is coupled to the harvesting boat and to continue ongoing collection and accumulation of the combustible biomass on the harvesting boat while the transfer boat is not coupled to the harvesting boat.

A system for harvesting microalgae is also disclosed. In one embodiment, the system includes a harvesting vessel configured to float and move on a body of water. The harvesting vessel includes a harvesting boom coupled to a harvesting vessel, where the harvesting boom skims a microalgae mixture of microalgae and water from a surface of the body of water down to a predetermined depth below the surface. The harvesting vessel also includes a separator aboard the harvesting vessel that separates water from the microalgae mixture and a microalgae collector that collects concentrated microalgae from the separator. In the embodiment, the system further includes a transfer vessel configured to float on the body of water and coupled to the harvesting vessel, where the transfer vessel includes a collection receptacle sized to store the concentrated microalgae and the microalgae collector deposits the concentrated microalgae on the transfer vessel coupled to the harvesting vessel.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
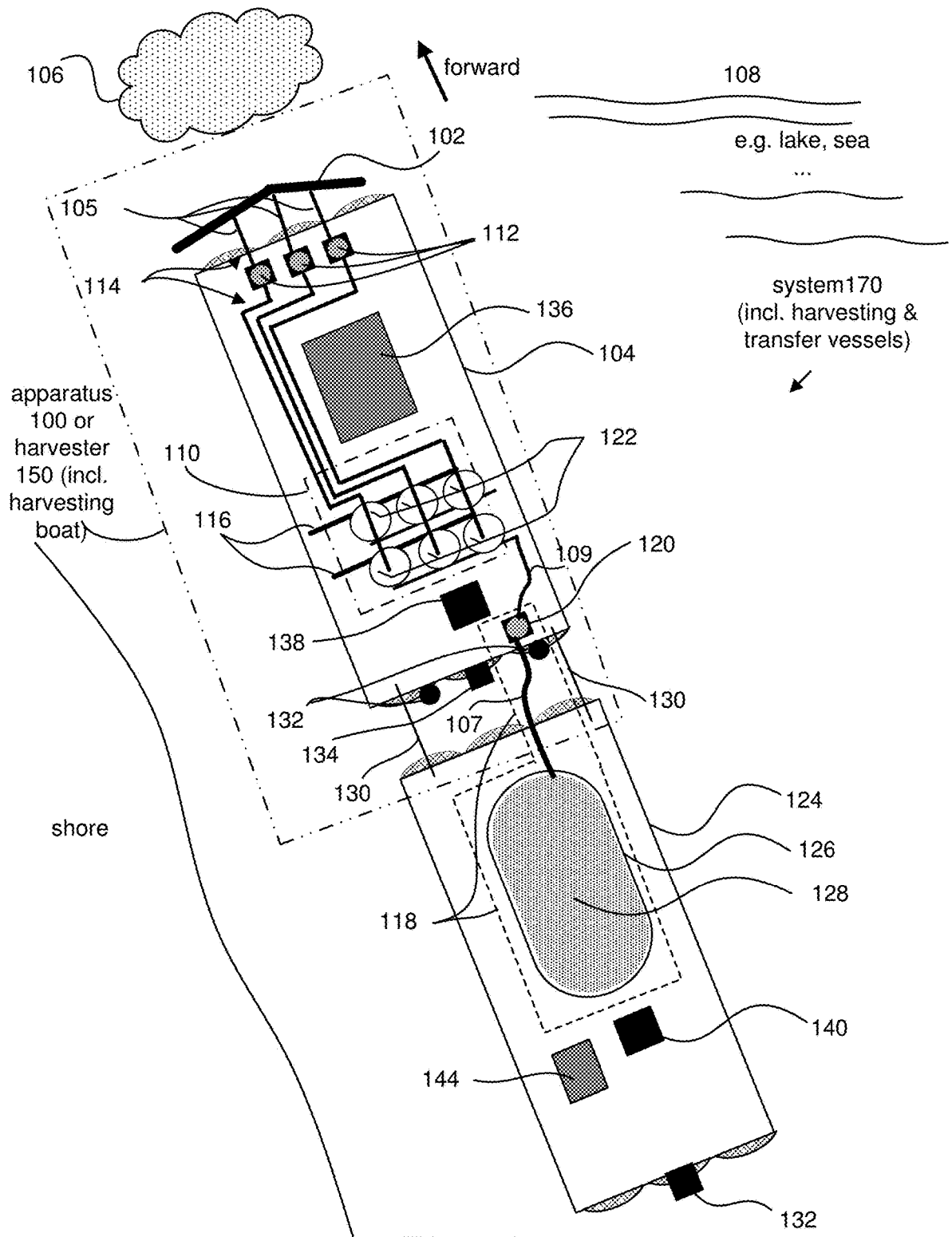
FIG. 1 is a schematic line drawing illustrating one embodiment of a mobile microalgae harvesting apparatus for removing microalgae from a body of water and producing concentrated microalgae biomass in liquid.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similar reference numbers in the Figures refer to similar elements in different embodiments unless otherwise clear from the context.

Furthermore, the described features, structures, or characteristics of the invention may be combined in any suitable manner in one or more embodiments. In the following description, numerous specific details are supplied, to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Hazardous algal blooms (HABs) are a serious environmental issue worldwide. A HAB during the summer of 2016 impacted Utah Lake, the Jordan River and connected canals, sickening over 100 people, closing beaches and marinas, and preventing agricultural use of the water. HABs occur when water conditions (temperature, solar insolation, nutrients) foster rapid growth of cyanobacteria (blue green algae). When cyanobacteria reach high concentrations, incoming sunlight is blocked, preventing photosynthesis. This results in death of the cyanobacteria, which release endotoxins that contaminate the water. In addition, the dead cyanobacteria decompose, depleting the water of oxygen (anoxic water), potentially killing fish. Decomposition also releases nutrients within the cyanobacteria, back into the water, making them available for subsequent blooms.

HABs can be prevented by harvesting the cyanobacteria (microalgae) before they reach dangerous concentrations. Removing the microalgae from the water also removes the nutrients they contain, reducing the overall nutrient load of the lake. In addition, the harvested cyanobacteria can be used as a carbon neutral, renewable, biomass fuel. The apparatuses and systems described herein are designed and tested to be suitable for microalgae collection. Moreover, with the benefit of the principles described herein some systems which may be currently unsuitable for microalgae collection may be made more suitable.

Accordingly, this application describes various embodiments of a mobile microalgae harvesting apparatus, a mobile microalgae harvester, and a system, each of which may be suitable for microalgae harvesting. Microalgae harvesting may include removal of harmful or unwanted microalgae from a body of water as well as separation and collection of the microalgae into a concentrated biomass suitable for energy production.

It may be noted that some embodiments disclose various embodiments of a mobile microalgae harvesting apparatus for use with new or retrofitted vessels including a harvesting vessel and/or a transfer vessel. Other embodiments disclose a mobile microalgae harvester that enables a harvesting vessel such as a harvesting boat to perform ongoing harvesting of microalgae while the harvesting boat is not coupled to a transfer boat. A system that includes the microalgae harvesting apparatus as well as the harvesting vessel and the transfer vessel is also disclosed.

In the disclosed apparatuses and system, the structure and operation of any of the microalgae harvesting apparatuses disclosed herein may be similarly structured and implemented whether they are provided as a mobile microalgae harvesting apparatus for use with existing vessels, or as a mobile microalgae harvester that includes a harvesting boat for ongoing harvesting, or as a system that includes both a harvesting vessel and a transfer vessel. Accordingly, the descriptions of the mobile microalgae harvesting apparatuses apply to embodiments of the mobile microalgae harvest as well as to systems that include a harvesting vessel and a transfer vessel.

A mobile microalgae harvesting apparatus is disclosed. In one embodiment the mobile microalgae harvesting apparatus includes a harvesting boom coupled to a harvesting vessel, where the harvesting boom skims a microalgae mixture of microalgae and water from a surface of a body of water down to a predetermined depth below the surface. The mobile microalgae harvesting apparatus also includes a separator aboard the harvesting vessel that separates water from the microalgae mixture and a microalgae collector that collects microalgae from the separator. The microalgae collector deposits the collected microalgae on a transfer vessel coupled to the harvesting vessel.

In some embodiments, the harvesting boom of the mobile microalgae harvesting apparatus is coupled to a front end of the harvesting vessel to skim the microalgae from the body of water at the predetermined surface depth. In some embodiments the harvesting boom includes one or more skimmer sections having an inverted trough shape, one or more moveable support levers that couple the intake skimmer boom to the front end of the harvesting vessel, and one or more intake ports that fluidly couple the one or more skimmer sections to one or more intake pumps disposed on the harvesting vessel.

In further embodiments, the harvesting boom includes one or more floats coupled to the one or more skimmer sections such that buoyancy of the floats maintains the skimmer sections on the body of water at a predetermined surface depth. In various embodiments, the predetermined surface depth is within an average range of about 0.5 to about 6 inches.

In some embodiments, the separator includes one or more filter assemblies that combine a combustible filter aid with the microalgae mixture prior to filtering to produce a filtride made of concentrated microalgae combined with the combustible filter aid for transfer to the harvesting vessel and a filtrate of discharge water suitable for return to the body of water. In at least one embodiment, the filtride includes a liquid and the microalgae collector includes a transfer pump that transfers the filtride from the harvesting vessel to the transfer vessel through a transfer hose.

In another embodiment, the separator includes a filter press and the filtride comprises one or more solid cakes. In the embodiment, the mobile microalgae harvesting apparatus may further include an air compressor coupled to the filter press to facilitate drying and removal of the one or more solid cakes. In some embodiments, the microalgae collector includes a conveyor 714 that transfers the filtride from the harvesting vessel to the transfer vessel via a conveyor belt.

In some embodiments, the one or more filter assemblies includes a pressurized chamber that receives the microalgae mixture, a filter in the pressurized chamber that allows water from the microalgae mixture to pass through the filter while preventing the microalgae from passing through the filter, and one or more scrapers in a top section of the pressurized chamber that scrape microalgae from the surface of the filter and move the concentrated microalgae toward the microalgae collector.

In one embodiment, the filter includes multiple layers including a top layer of cellulose or cellulose on top of a layer of diatomaceous earth, a layer of sand, and a layer of gravel, where the top layer is adjacent to the top section of the pressurized chamber. The filter may also include a liquid permeable fabric disposed between adjacent layers of the multiple layers for keeping the layers separate and a screen disposed below the layer of gravel.

In some embodiments, the pressurized chamber has a generally cylindrical shape; and the one or more scrapers are disposed on a rotary arm that rotates radially about a cylindrical axis of the pressurized chamber. In other embodiments, the pressurized chamber has a generally rectangular shape; and the one or more scrapers are spaced apart on an outer surface of a continuous belt.

In still other embodiments, the mobile microalgae harvesting apparatus includes one or more filter assemblies that include a pressurized chamber that receives the microalgae mixture. A filter lines sides of the pressurized chamber, where the filter allows water from the microalgae mixture to pass through the filter while preventing the microalgae from passing through the filter. The pressurized chamber also includes a plunger that scrapes microalgae from the filter toward a bottom of the pressurized chamber, where the one or more filter assemblies collect microalgae at the bottom of the pressurized chamber for collection by the microalgae collector.

In some embodiments, the mobile microalgae harvesting apparatus is disposed aboard a harvesting vessel and harvesting vessel and/or the transfer vessel are sized and sufficiently lightweight so as to be transportable over land to the body of water by a conventional pickup truck pulling a conventional trailer. In other embodiments, the mobile microalgae harvesting apparatus includes a generator that uses the collected microalgae as a fuel to provide at least a portion of power for operating one or more powered devices on the harvesting vessel.

Another mobile microalgae harvester is also disclosed. The mobile microalgae harvester includes a harvesting boom coupled to a harvesting boat, where the harvesting boom skims a microalgae mixture of microalgae and water from a surface of a body of water down to a predetermined depth below the surface. The mobile microalgae harvester also includes a filter aid assembly that combines a combustible filter aid with the microalgae mixture. In the embodiment, the mobile microalgae harvester includes one or more filter assemblies aboard the harvesting boat, where each of the one or more filter assemblies includes a filter and one or more scrapers that scrape a combustible biomass in the form of combined combustible filter aid and microalgae from a surface of the filter. The mobile microalgae harvester also includes a microalgae collector that collects the combustible biomass from the one or more filter assemblies and accumulates the combustible biomass on the harvesting boat. The microalgae collector is configured to transfer the accumulated combustible biomass to a transfer boat while the transfer boat is coupled to the harvesting boat and to continue ongoing collection and accumulation of the combustible biomass on the harvesting boat while the transfer boat is not coupled to the harvesting boat.

A system for harvesting microalgae is also disclosed. In one embodiment, the system includes a harvesting vessel configured to float and move on a body of water. The harvesting vessel includes a harvesting boom coupled to a harvesting vessel, where the harvesting boom skims a microalgae mixture of microalgae and water from a surface of the body of water down to a predetermined depth below the surface. The harvesting vessel also includes a separator aboard the harvesting vessel that separates water from the microalgae mixture and a microalgae collector that collects concentrated microalgae from the separator. In the embodiment, the system further includes a transfer vessel configured to float on the body of water and coupled to the harvesting vessel, where the transfer vessel includes a collection receptacle sized to store the concentrated microalgae and the microalgae collector deposits the concentrated microalgae on the transfer vessel coupled to the harvesting vessel.

FIG. 1 is a schematic line drawing illustrating one embodiment of a mobile microalgae harvesting apparatus 100 for removing microalgae from a body of water and producing concentrated microalgae 128 biomass in liquid. In the embodiment depicted, the mobile microalgae harvesting apparatus 100 includes a harvesting boom 102 that is configured to be mechanically and fluidically coupled to a harvesting vessel 104. In some embodiments the harvesting vessel 104 is a self-propelled barge, skiff, pontoon or another type of flat-bottom boat that facilitates navigation close to a shore. However, in other embodiments the harvesting vessel is any type of craft adapted for use over the surface of a body of water 108 e.g. a lake, pond, sea, and so forth. The harvesting boom 102 skims a microalgae mixture 106 of microalgae and water from a surface of a body of water 108 down to a predetermined depth below the surface. Further details about the harvesting boom 102 are provided below with respect to FIGS. 2-3.

The mobile microalgae harvesting apparatus 100 includes a separator 110 for mounting aboard the harvesting vessel 104 to separate water from the microalgae mixture 106. The separator 110 includes one or more intake pumps 112 that pump the microalgae mixture 106 skimmed by the harvesting boom 102 through one or more intake hoses 114 that fluidically couple to the one or more pump intake ports 116 of the skimmer sections 102a and 102b of the harvesting boom 102 to one or more filter assemblies 122. In other embodiments, forward movement of the harvesting vessel 104 push the microalgae mixture 106 into the one or more filter assemblies 122. Additional details regarding various embodiments of the separator 110 are described below with respect to FIGS. 4-6.

The mobile microalgae harvesting apparatus 100 also includes a microalgae collector 118 that collects microalgae from the separator 110. In one embodiment, the microalgae collector (e.g. 118, 718) deposits the collected microalgae on a transfer vessel 124 coupled to the harvesting vessel 104. In some embodiments, the microalgae collector 118 collects concentrated microalgae 128 in liquid. In such embodiments, the microalgae collector 118 includes one or more transfer pumps 120 that fluidically couple the one or more filter assemblies 122 to the microalgae collector 118 via one or more transfer hoses 107 or similar. While embodiments described herein reference a microalgae mixture, the harvesting apparatus 100 and system 170 described herein may also be used to skim other materials from a surface of a body of water where the materials include particles separable from water and small enough to be collected by the harvesting boom 102.

In other embodiments, such as the embodiments described below with respect to FIGS. 7-8, the microalgae collector 718 collects concentrated microalgae as solid cakes 728. In such embodiments, the microalgae collector 718 includes one or more conveyors 714 such as for example a conveyor belt for transferring the solid cakes 728 of concentrated microalgae from the harvesting vessel 104 to the transfer vessel 124. Further details regarding embodiments of the microalgae collector 718 for collecting and conveying solid cakes 728 of concentrated microalgae are provided in the description below with respect to FIGS. 7-8.

In some embodiments, the mobile microalgae harvesting apparatus 100 is configured to deposit the concentrated microalgae 128 that it collects to a transfer vessel 124 that is coupled to the harvesting vessel 104. In some embodiments, the transfer vessel 124 includes a holding tank 126 that is fluidically coupled to the one or more transfer pumps 120 which transfer concentrated microalgae 128 in liquid from the harvesting vessel 104 to the holding tank 126 on the transfer vessel 124. In some embodiments, the transfer vessel 124 is navigated to a predetermined location so that the concentrated microalgae 128 in the holding tank 126 may be transferred again to another container for transport or storage, such as for example, a stationary container or storage tank at a dock or a mobile container or storage tank on a truck or a railcar.

In some embodiments, the mobile microalgae harvesting apparatus 100 is configured to permit the harvesting vessel to perform ongoing harvesting and accumulation, separation, and collection of microalgae for a predetermined period of time whether or not a transfer vessel 124 is coupled to the harvesting vessel 104. In some embodiments, the mobile micro algae harvesting apparatus transfers the concentrated microalgae 128 for use as a combustible biomass from the harvesting vessel 104 to the transfer vessel 124 (e.g. a transfer boat) at a time when the transfer vessel 124 is coupled to the harvesting vessel 104. In some embodiments, the microalgae collector 718 is configured to deposit the concentrated microalgae in the form of solid cakes 728 to a collection receptacle (e.g. holding tank 126) sized to store a predetermined amount of concentrated microalgae 128.

In some embodiments, the mobile microalgae harvesting apparatus 100 is disposed aboard a harvesting vessel 104 that is configured to be mechanically coupled to the transfer vessel 124 via one or more tow lines 130. The one or more tow lines 130 may also be used as mooring lines for mooring the harvesting vessel 104 to a dock. In some embodiments, the transfer vessel 124 is a stationary transfer vessel e.g. a transfer vessel built upon or temporarily disposed upon a dock or a navigable transfer vessel that is moored to a dock.

In some embodiments, the harvesting vessel 104 includes one or more trolling motors 132 or similar propulsion systems for propelling the harvesting vessel 104 at low speeds, such as for example, speeds in the range of about 2 mph to 3 mph. Low-speed propulsion facilitates efficient and effective harvesting of the microalgae mixture 106 from the surface of the body of water 108 by the harvesting boom 102. In some embodiments, the trolling motors 132 are sized to provide sufficient propulsion to tow the transfer vessel 124 during intake of the microalgae mixture 106 by the harvesting boom 102 on the harvesting vessel 104.

In some embodiments, the harvesting vessel 104 also includes an engine 134 for propelling the harvesting vessel 104 at significantly higher speeds than those achievable by the one or more trolling motors 132. The engine 134 facilitates faster navigation to and from a particular harvesting area when no microalgae harvesting is being performed en route.

In some embodiments, the harvesting vessel 104 includes a console 138 that includes various controls for controlling the vessel, its motors/engines, its steering mechanisms, and other onboard powered devices. In some embodiments, at least a portion of the controls within the console 138 is manually controlled. In other embodiments, at least a portion of controls within the console 138 is automatically controlled by one or more processors that execute preprogrammed instructions. In still other embodiments, at least some of the controls within the console 138 are remotely controlled. In some embodiments, the console 138 includes a combination of manual, automatic, and remote controls.

In some embodiments, the harvesting vessel 104 includes a generator 136 that generates power for operating one or more powered devices onboard. The one or more powered devices include, in some examples, an intake pump 112, a transfer pump 120, a motor for driving rotary-driven or belt-drive scrapers in the one or more filter assemblies 122, a trolling motor 132, a control in a console 138, and so forth.

In some embodiments, the generator 136 is a diesel generator. In other embodiments, the generator 136 is a biofuel generator which uses concentrated microalgae combined with combustible filter aid as a renewable biomass fuel for providing at least a portion of power for operating one or more powered devices on the harvesting vessel 104.

In some embodiments, the harvesting vessel 104 includes more than one type of generator 136 such as a diesel generator and a biomass generator. In such embodiments, power is allocated according to the power capacity of the generator 136 and powered devices' power requirements.

In embodiments in which the transfer vessel 124 is mobile e.g. navigable, the transfer vessel 124 may be self-propelled and may also include a console 140 and an engine 142 similar to those described above with respect to the harvesting vessel 104. Likewise, the transfer vessel 124, in some embodiments, includes a generator 144 that is a diesel or gasoline powered generator, a biomass power generator, etc. The generator 144 may be similar to the generator 136 described above with respect to the harvesting vessel 104.

Before providing additional detail about the various components of different embodiments of the mobile microalgae harvesting apparatus 100, a high-level description of a mobile microalgae harvester 150 configured to perform ongoing harvesting and a system 170 for harvesting microalgae which include the harvesting vessel 104 and transfer vessel 124 are provided.

As mentioned above, a mobile microalgae harvester 150 for ongoing harvesting microalgae by a harvesting boat is disclosed. In one embodiment, the mobile microalgae harvester 150 includes a harvesting boom 102 that couples to the harvesting vessel 104 that is a harvesting boat. The harvesting boom 102 skims a microalgae mixture 106 of microalgae and water from a surface of a body of water 108 down to a predetermined depth below the surface. The mobile microalgae harvester 150 further includes a filter aid assembly 152 that combines a combustible filter aid with the microalgae mixture 106.

The mobile microalgae harvester 150 also includes one or more filter assemblies 122 aboard the harvesting boat 104, where each of the one or more filter assemblies 122 includes a filter and one or more scrapers that scrape a combustible biomass made of the combined combustible filter aid and microalgae from a surface of the filter.

The mobile microalgae harvester 150 further includes a microalgae collector 118 that collects the combustible biomass from the one or more filter assemblies and accumulates the combustible biomass on the harvesting boat 104. In the embodiment, the microalgae collector 118 is configured to transfer the accumulated combustible biomass to a transfer boat 124 while the transfer boat 124 is coupled to the harvesting boat 104 and to continue ongoing collection and accumulation of the combustible biomass on the harvesting boat 104 while the transfer boat 124 is not coupled to the harvesting boat 104.

A system 170 is disclosed that includes both the harvesting vessel 104 and a transfer vessel 124. The harvesting vessel 104 is configured to float and move on a body of water (e.g. 108). The harvesting vessel 104 has a harvesting boom 102 coupled to a forward end of the harvesting vessel 104. The harvesting boom 102 skims the microalgae mixture 106 of microalgae and water from a surface of the body of water 108 down to a predetermined depth below the surface. The system 170 also includes a separator 110 aboard the harvesting vessel 104 that separates water from the microalgae mixture 106. The system 170 has a microalgae collector 118 that collects concentrated microalgae from the separator 110. Additionally, the system 170, in some embodiments, includes a transfer vessel 124 configured to float on the body of water. The transfer vessel 124 is configured to be detachably coupled to the harvesting vessel 104.

Figure 2:
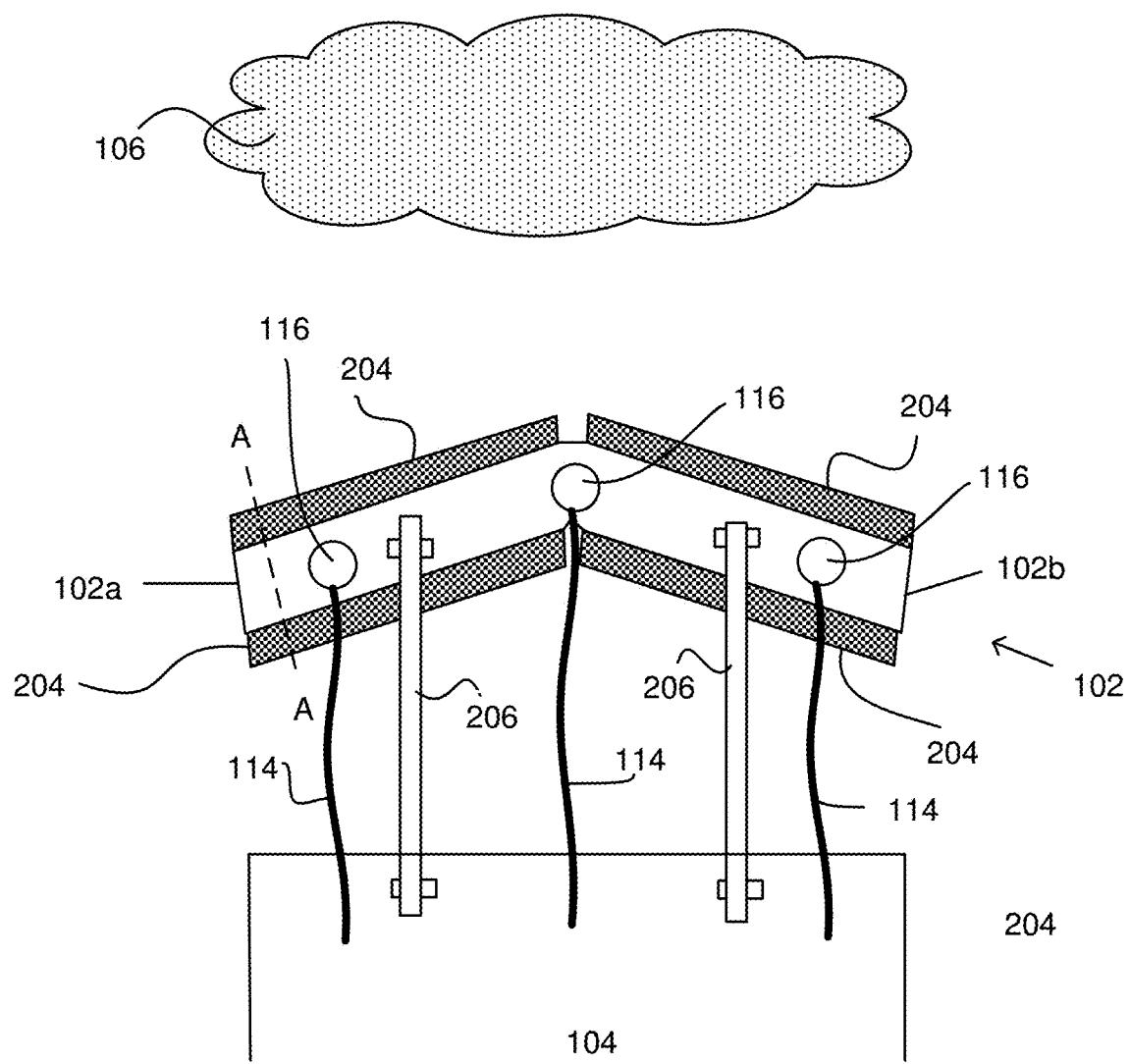
FIG. 2 is a schematic line drawing depicting a top view of one embodiment of a harvesting boom for harvesting microalgae from a body of water.
Figure 3:
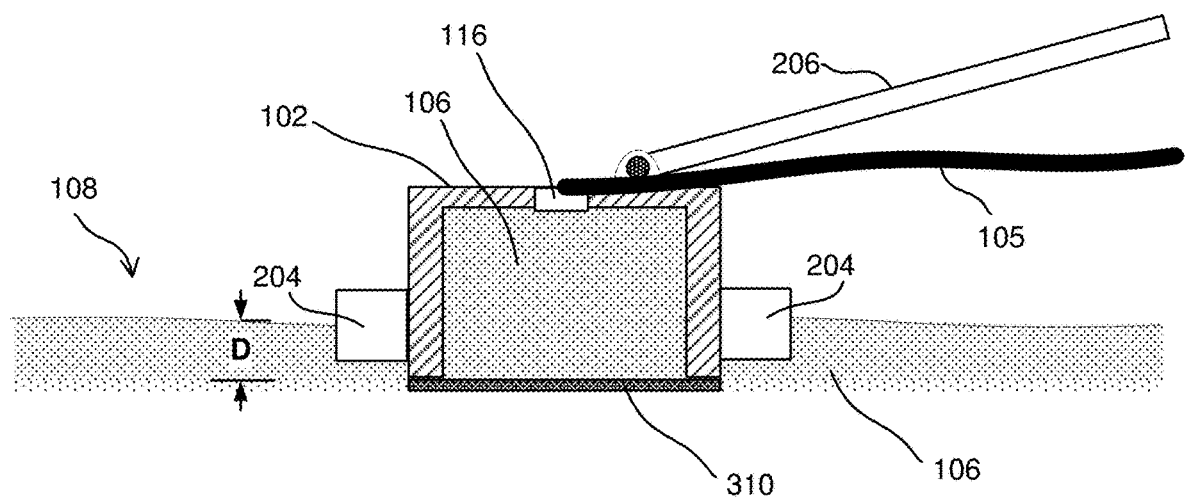
FIG. 3 is a schematic line drawing illustrating a cross-sectional view of the embodiment of the harvesting boom of FIG. 2.
Figure 7:
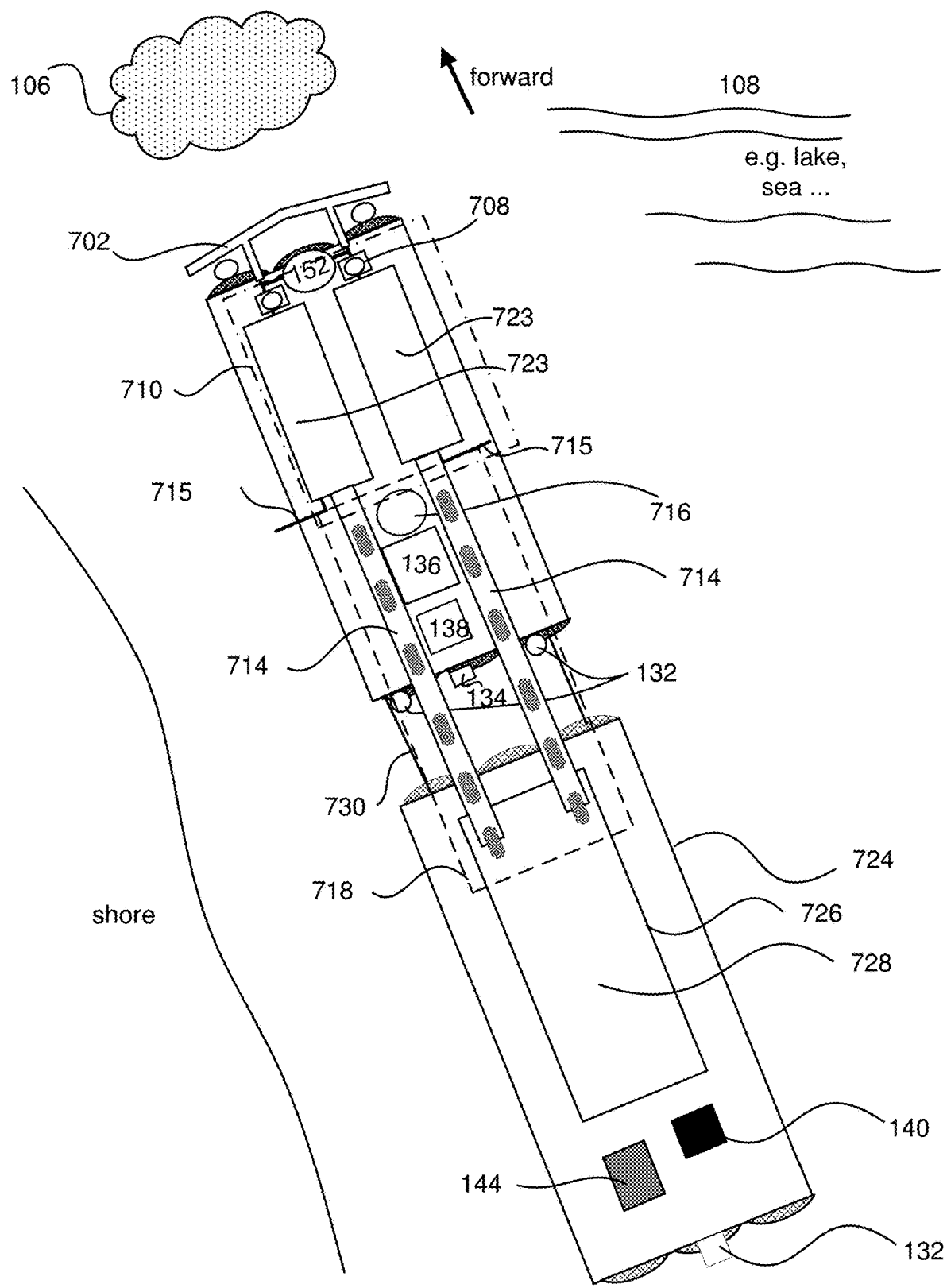
FIG. 7 is a schematic line drawing illustrating a different embodiment of a mobile microalgae harvesting apparatus for removing microalgae from a body of water and producing concentrated microalgae biomass in solid cakes.

Referring now to FIGS. 2 and 3 to provide additional details related to structure and operation of the harvesting boom mentioned with respect to FIGS. 1 and 7. FIG. 2 is a schematic line drawing depicting a top view of one embodiment of a harvesting boom for collecting microalgae from a body of water. FIG. 3 is a schematic line drawing illustrating a cross-sectional view of the embodiment of the harvesting boom of FIG. 2.

In some embodiments, the harvesting boom is coupled to a front end (e.g. the bow) of the harvesting vessel 104 to skim the microalgae mixture 106 of microalgae and water from the body of water at the predetermined surface depth. The harvesting boom 102 may also be referred to herein as an intake skimmer boom. Because microalgae are photosynthetic, the microalgae have developed the ability to float on the surface of the water in order to capture sunlight. This means that the highest concentration of microalgae is at the surface of the body of water.

As illustrated in FIG. 3, in some embodiments, the harvesting boom 102 is designed to float in the water at a predetermined level, so that the most concentrated microalgae mixture 106 can be skimmed from the surface of the water down to a predetermined depth D below the surface (referred to as a predetermined surface depth). As used herein, the term skim may refer to any of various methods for removing microalgae from the surface of the body of water including, for example, pumping a mixture of microalgae and water from the underside of skimmer sections 102a and 102b.

The skimmer sections 102a, 102b may be shaped like an inverted trough as shown in FIG. 3. The predetermined level at which the harvesting boom skims the microalgae from the surface of the body of water down to the predetermined surface depth D is, in some embodiments, a depth capable of skimming a portion of microalgae in a column of the body of water. In some embodiments, the microalgae floating in the body of water includes a layer where a majority of microalgae in a column of water is found and the predetermined surface depth D is below the layer of microalgae. In some examples, the predetermined surface depth D is within an average range of about 0.5 inches to about 6 inches. In some embodiments, the average predetermined surface depth is about 2 inches. In some embodiments, an intake screen 310 covers a lower opening of the inverted trough-shape of the skimmer sections 102a, 102b to screen out larger debris which might otherwise enter the pump intake ports 116, the intake pumps 112, and/or the filter assemblies 122 which receive the microalgae mixture pumped from the pump intake ports 116 by the intake pumps 112.

In some embodiments, one or more floats 204 attached to the skimmer sections 102a, 102b of the harvesting boom 102. The floats 204 is made of a buoyant material such as a type of foam used in boats or other flotation devices. The size and the buoyancy of the floats 204 is predetermined so as to provide sufficient buoyancy to facilitate flotation of the harvesting boom 102 at the predetermined depth D over a predetermined range of navigation speed used during harvesting of microalgae.

In some embodiments, the efficiency of the microalgae harvesting is maximized by configuring the harvesting boom 102 to float at a depth that maximizes the intake of concentrated microalgae at the surface of the body of water while at the same time minimizing the intake of water below the surface of the body of water containing lesser concentrations of microalgae. Additionally, because surface movement e.g. waves on the body of water may cause the harvesting boom to move up and down vertically, in some embodiments the harvesting boom 102 is configured to float at a level where the predetermined surface depth is within a range of about 0.5 inch to about 6 inches. Such as range may minimize air intake which might occur if the boom bounced out of the water and may minimize a bottom of the harvesting boom 102 rising to a level that misses collecting microalgae. In some embodiments, the harvesting boom 102 is adjustable to be set at a lower level in choppy water.

In some embodiments, the harvesting boom 102 is detachably coupled to a forward end of one or more boom support levers 206 (e.g. pinion support levers) which in turn are detachably coupled at to a deck of the harvesting vessel 104 using removable pins 205 that allow the boom support levers 206 to pivot up and down around the removable pins 205.

In some embodiments, the harvesting boom 102 is controlled electrically or manually to be raised out of the water for navigation at higher speeds to or from a particular harvesting area of the body of water. The harvesting boom 102, in some examples, is controlled electrically or manually to be lowered into the water for navigation at lower speeds during harvesting.

In some embodiments, one or more pump intake hoses 105 is arranged to fluidically couple the pump intake ports 116 of the harvesting boom 102 to one or more intake pumps 112 that in turn are fluidically coupled to one or more filter assemblies 122, also sometimes referred to herein as filter packs. Further details regarding various embodiments that may be used to implement the filter assemblies 122 are described below with respect to FIGS. 4-8.

In one embodiment, the one or more skimmer sections 102a, 102b of the harvesting boom 102 is angled to form a shallow arrowhead shape where the center portion of the harvesting boom 102 is the foremost section and left and right outer ends of the skimmer sections 102a, 102b are slightly further back. The angled design helps force larger floating debris to the sides, out of the path of the harvesting vessel 104. Referring now to FIG. 4-7, which describe various embodiments of the separator 110 and one or more filter assemblies (e.g. 122, 422, 522, 622).

Figure 4:
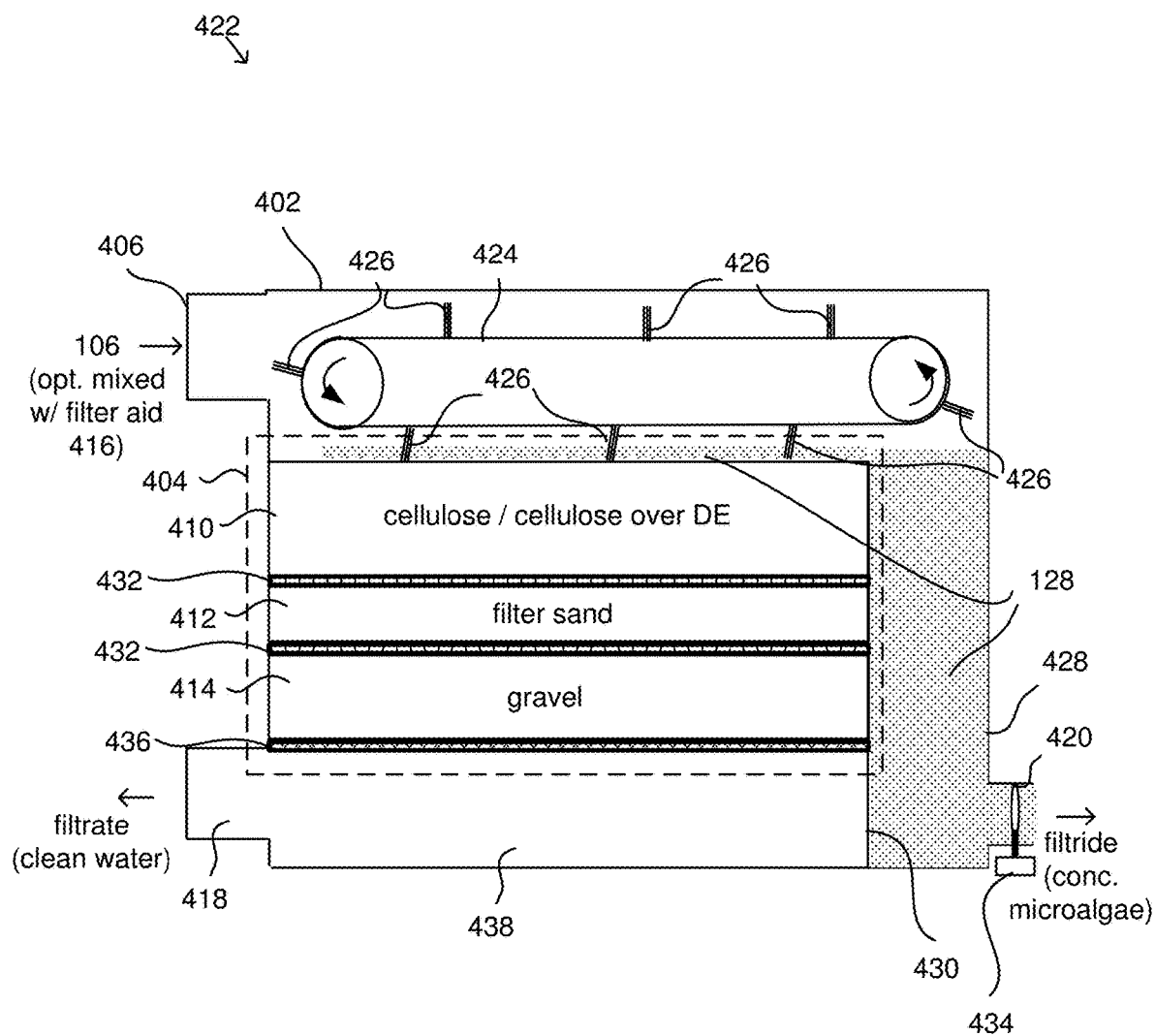
FIG. 4 is a schematic line drawing depicting one embodiment of a separator with a belt-scraped layered filter for concentrating microalgae in a liquid mixture.

FIG. 4 is a schematic line drawing depicting one embodiment of a filter assembly 422 for concentrating microalgae in liquid. The filter assembly 422 includes a pressurized chamber 402 with a generally rectangular shape. The pressurized chamber has an input 406 for receiving an inflow of the microalgae mixture 106. The pressurized chamber 402 includes a layered filter 404 that allows water from the microalgae mixture 106 to pass through the filter 404 and to flow out of the filtrate output 418 while preventing the concentrated microalgae 128 (filtride) from passing through the filter 404. The one or more filter assemblies 422 include, in some embodiments, one or more scrapers (e.g. 426) in a top section of the pressurized chamber 402. The one or more scrapers (e.g. 426) scrape microalgae from the surface of the filter 404 and move the concentrated microalgae 128 toward the microalgae collector 118. Further details about the one or more scrapers (e.g. 426) are provided below.

As used herein, the term "filtrate" refers to a liquid or solution that has passed through the filter 404 of the one or more filter assemblies 422. For example, discharge water from which a substantial portion of microalgae has been filtered is a filtrate. Complementarily, the term "filtride", refers to the residue (e.g., concentrated microalgae) that has been separated from the filtrate by the filter 404 of the one or more filter assemblies 422.

Because microalgae are a unicellular species which exist individually or in chains or groups, the size of the microalgae cells may range from a few μm to a few hundred μm. For example, cyanobacteria cells may range in size from about 0.5 μm to about 40 μm in diameter. In contrast, macroalgae may be significantly larger ranging from a few millimeters on up to tens of meters. Accordingly, effective filtering of microalgae (e.g. cyanobacteria) requires use of filter that can filter smaller particles than filters designed to filter macroalgae.

As depicted in FIG. 4, in some embodiments, the filter 404 in the pressured chamber 402 include, in some embodiments, a plurality of layers (e.g. 410,412,414). For example, the plurality of layers may include a top layer 410 selected from the layer 412 comprising sand in the middle; and layer 414 of gravel at the bottom.

The successive filter layers (e.g. 410,412,414), in various embodiments, are dimensioned so as to effectively enable the filtered water (e.g. filtrate) to flow through the filter for discharge to the body of water 108. The filter 404, in some embodiments, includes a water permeable fabric 432 between each pair of adjacent filter layers (e.g. 410 and 412 or 412 and 414) for preventing filter material from one layer (e.g. 410 or 412) from passing to lower adjacent layer (e.g., 412 or 414). Similarly, a filter screen 436, in some embodiments, is disposed adjacent to and below the layer 414 of gravel at the bottom to ensure that the gravel is kept in its intended layer. Below the filter screen 436, a lower portion 438 of the pressurized chamber 402 channels the water that has been filtered e.g. filtrate from the microalgae mixture 106 towards a filtrate output 418.

The pressurized chamber 402 also includes a filtride output 420. In some embodiments, the filtride output 420 includes a valve 434 for preventing unintentional discharge of concentrated microalgae 128 during certain stages of filtration under pressure. The filtride output 420, in various embodiments, is fluidically and/or mechanically coupled to the microalgae collector 118 so as to transfer the concentrated microalgae 128 filtride from the pressurized chamber 402 to a holding tank (e.g. 128) which, in some embodiments, is included on the transfer vessel (e.g. 124), on the harvesting vessel 104, or one or more holding tanks 128, in other embodiments, are included on the harvesting vessel 104 and, in some embodiments, one or more holding tanks are additionally included on the transfer vessel 124

In some embodiments, a filter aid is added to the microalgae mixture to improve the flow of the water (filtrate) through the filter 404 and to facilitate capture of desired size of microalgae as filtride. The term "filter aid" refers generally to an inert material for protecting the basic filtering medium of a filter system.

In existing systems, some common filter aids are noncombustible such as for example diatomaceous earth (DE), perlite, asbestos and the like. It may be noted that some biological organisms such as yeast cells have a size comparable to that of cyanobacteria microalgae cells. In some yeast removal filters, noncombustible filter aid materials used alone or mixed with combustible filter aid materials. the use of noncombustible filter aids, such as DE, perlite, which are primarily composed of silica (silicon dioxide) may introduce glasslike materials into a biofuel generator resulting in damage or diminished operation. If a filter aid material includes noncombustible components, it may be unsuitable for removing microalgae cells from water in applications in which the concentrated microalgae 128 is intended for use as a biofuel.

In certain embodiments, the one or more filter assemblies 422 take in microalgae mixture 106 mixed with a combustible filter aid 416 prior to filtering to produce a filtride comprising concentrated microalgae combined with the combustible filter aid 416 for collection by the microalgae collector.

Accordingly, in the embodiment depicted in FIG. 4, the pressurized chamber 402 includes one or more scrapers 426 that are spaced apart on an outer surface of a continuous belt 424. As the one or more scrapers 426 on the continuous belt 424 move across the top layer (e.g. 410) of the filter 404, they scrape the concentrated microalgae 128 that has collected on the top layer 410 of the filter 404 towards a filtride collection compartment 428 of the pressurized chamber which is separated from the filter layers (e.g. 410, 412, 414) by a wall 430 or similar structure. In some embodiments, the scrapers 426 are made of flexible brush-like material so as to brush the concentrated microalgae 128 (e.g. filtride) off the top layer for 10 into the filtride collection compartment 428. Scraping and/or brushing the concentrated microalgae 128 filtride off of the filter 404, in some embodiments, assists in keeping the water flow rates at an acceptably high level by preventing the filter from becoming plugged.

The concentrated microalgae 128 then flows out the filtride output 420 to the microalgae collector 118. In some embodiments, the microalgae collector 118 includes one or more transfer pumps that pump the filtrate from the collection output 109 of the one or more filter assemblies via a transfer hose 107 to a holding tank (e.g. 128) on the transfer vessel 124 as shown in FIG. 1, or on the harvesting vessel 104, or on both the harvesting vessel 104 and the transfer vessel 124.

Figure 5:
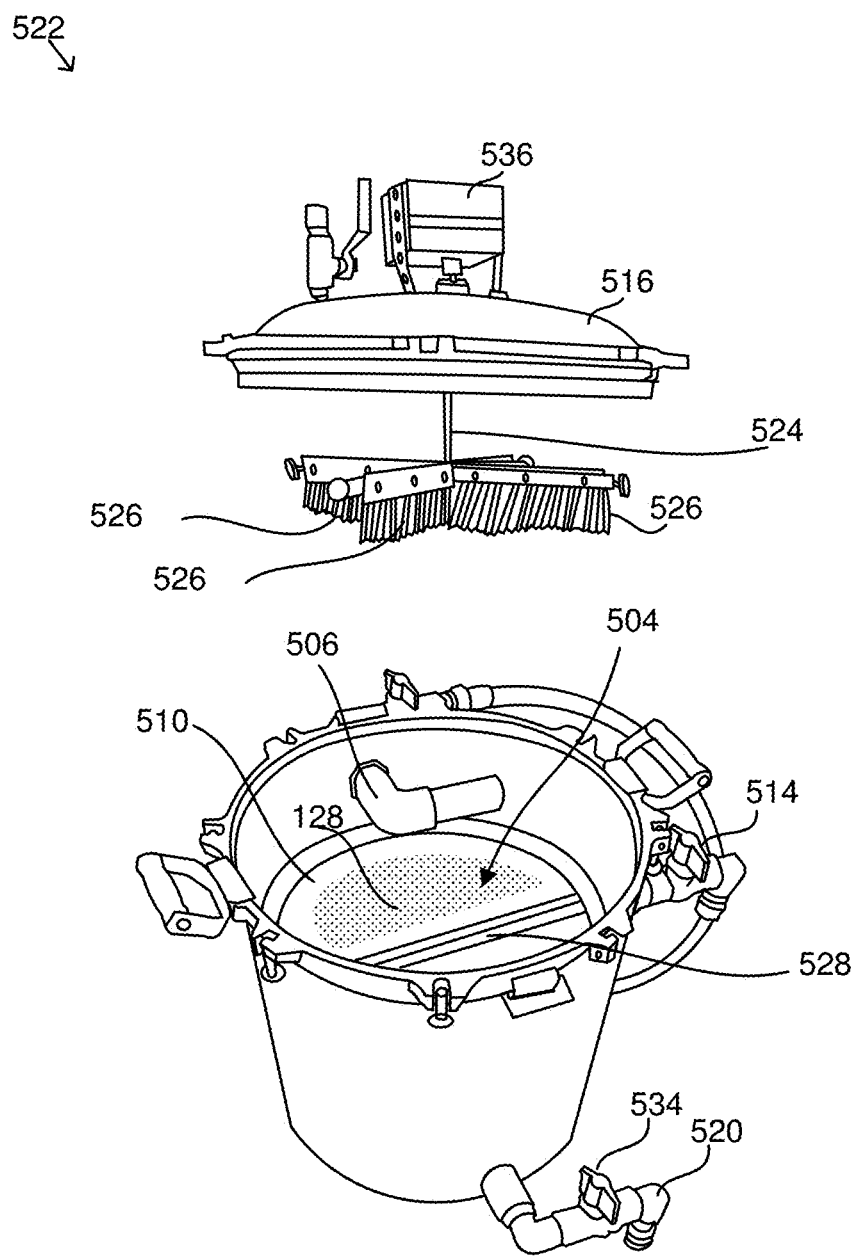
FIG. 5 is a schematic line drawing depicting one embodiment of a separator with a rotary-scraped layered filter for separating water from concentrated microalgae.

FIG. 5 is a schematic line drawing depicting one embodiment of a filter assembly 522 for separating water from concentrated microalgae 128. The filter assembly 522 includes a pressurized chamber 502 that has a generally cylindrical shape. In some embodiments, the pressurized chamber 502 includes a filter 504 that has multiple layers arranged and composed substantially similarly layers (e.g., 410, 412, and 414) as described above with respect to the filter 404. The pressurized chamber 502, in various embodiments, further includes a lid 516 through which a rotary shaft 524 passes. The rotary shaft 524, in some embodiments, is driven by a motor 536 disposed above the lid 516.

The embodiment of the filter assembly 522 includes one or more scrapers 526 configured as rotary arms 532 that are coupled to the rotary shaft 54 so as to rotate radially about a cylindrical axis of the pressurized chamber 502. As the one or more scrapers 526 are rotated, they brush across the surface of the top layer 510 of the filter 504 in a manner similar to that depicted above with respect to the scrapers 426 on the continuous belt of FIG. 4 except that the one or more scrapers 526 rotate about the cylindrical access of the pressurized chamber 502.

The top layer 510 of the filter 504, in some embodiments, has a collection channel 528 that channels the concentrated microalgae 128 filtride towards a filtride output 520. In various embodiments, the filtride output 520 includes a valve 534 for preventing unintentional discharge of concentrated microalgae 128 during certain stages of filtration under pressure. The filtride output 520, in some examples, is fluidically coupled to the microalgae collector e.g. 118. The microalgae collector e.g. 118, then transfers the concentrated microalgae 128 filtride to the transfer vessel 124 as depicted and described above with respect to FIG. 1. Similarly, as explained above with suspected FIGS. 1 and 4, filtered or clean water is discharged from the filtrate output 518 into the body of water e.g. 108, thus making the body of water cleaner.

Figure 6:
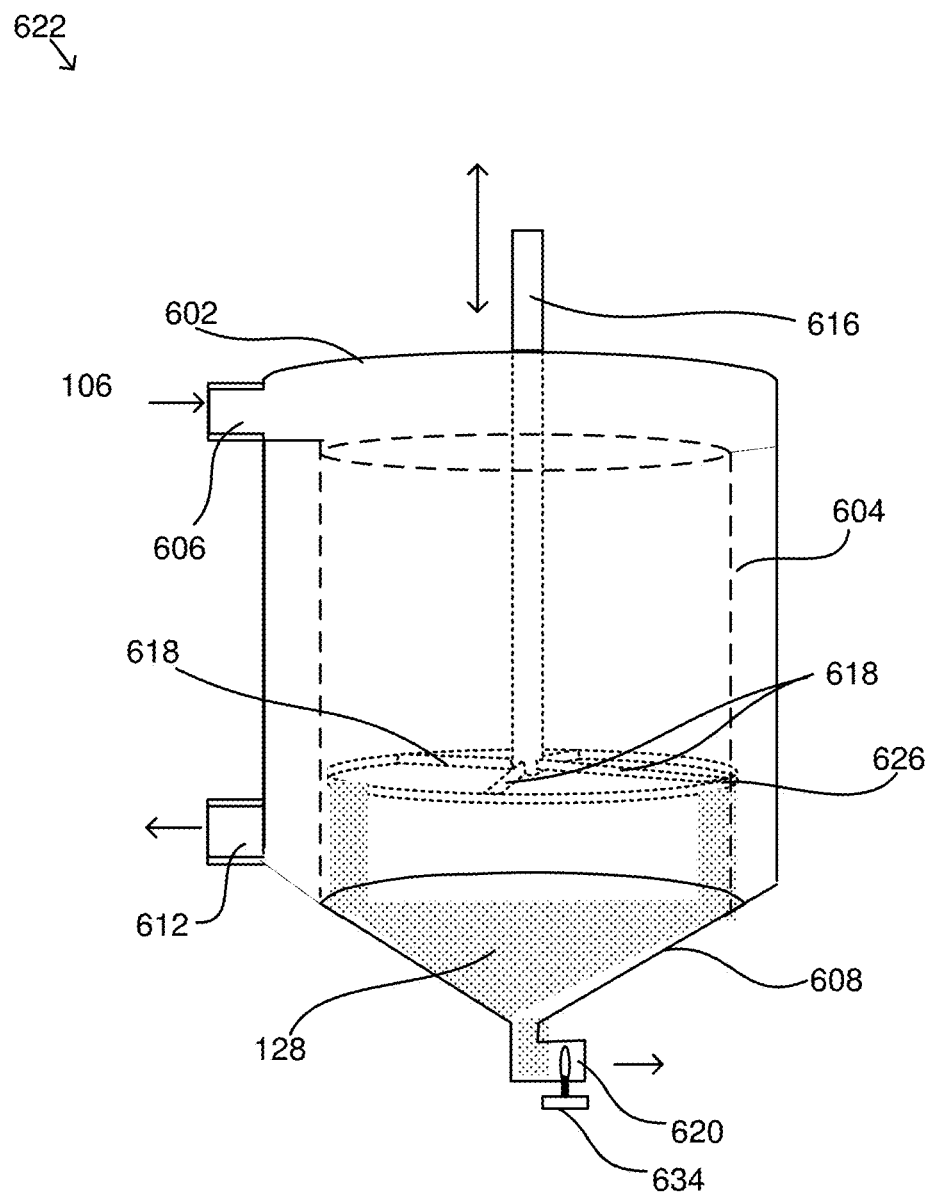
FIG. 6 is a schematic line drawing depicting another embodiment of a separator with a filtered lining for separating water from concentrated microalgae in a liquid mixture.

FIG. 6 is a schematic line drawing depicting another embodiment of a filter assembly 622 for separating water from the microalgae mixture 106. The filter assembly 622 has a pressurized chamber 602 that is substantially cylindrical. The pressurized chamber 602 includes an input 606 that receives inflow of the microalgae mixture 106 optionally combined with the combustible filter aid e.g. 416.

In the embodiment, rather than using a filter made of adjacent layers e.g. 410, 412, 414 of filtering material such as diatomaceous earth, sand, and gravel, as disclosed above with respect to FIGS. 4 and 5, the filter 604 is made of a thin cylinder of water permeable fabric that outlines an inner wall of the pressurized chamber 602. As with the other embodiments described herein, the pressurized chamber 602 includes a filtrate output 612 for discharging clean water (e.g. filtrate) to the body of water 108. The pressurized chamber 602 further includes, in some embodiments, a filtride output 620 that is fluidically coupled to the microalgae collector 118. The filtride output 620 includes, in some examples, a valve 634 for preventing unintentional discharge of concentrated microalgae 128 during certain stages of filtration under pressure.

The filter assembly 622 also includes a plunger 626 and a rod 616, and a plurality of spokes 618 that extend radially outward to couple bottom end of the rod 616 to the plunger 626 for scraping concentrated microalgae 128 from the inner surface of the filter 604 toward a bottom of the pressurized chamber 602. The pressurized chamber also includes a filtride output 620. The filtride output 620, in some embodiments, includes a valve 634 for preventing unintentional discharge of concentrated microalgae 128 during certain stages of filtration under pressure. The filtride output 620, in some embodiments, is fluidically coupled to the microalgae collector e.g. 118 for transferring the concentrated microalgae 128 to a holding tank e.g. 126.

As with other embodiments described above, the filter assembly 622 intakes the microalgae mixture 106 which is combined with a combustible filter aid (e.g. 416), in some embodiments, such as cellulose. In some examples, a top end of the rod 616 is coupled to an oscillating motor (not shown) or a pneumatic oscillator (not shown) for repeatedly moving the plunger 626 up and down to perform ongoing filtering of the microalgae mixture 106 and scraping of the concentrated microalgae 128 with or without the addition of the combustible filter aid 416.

Figure 8:
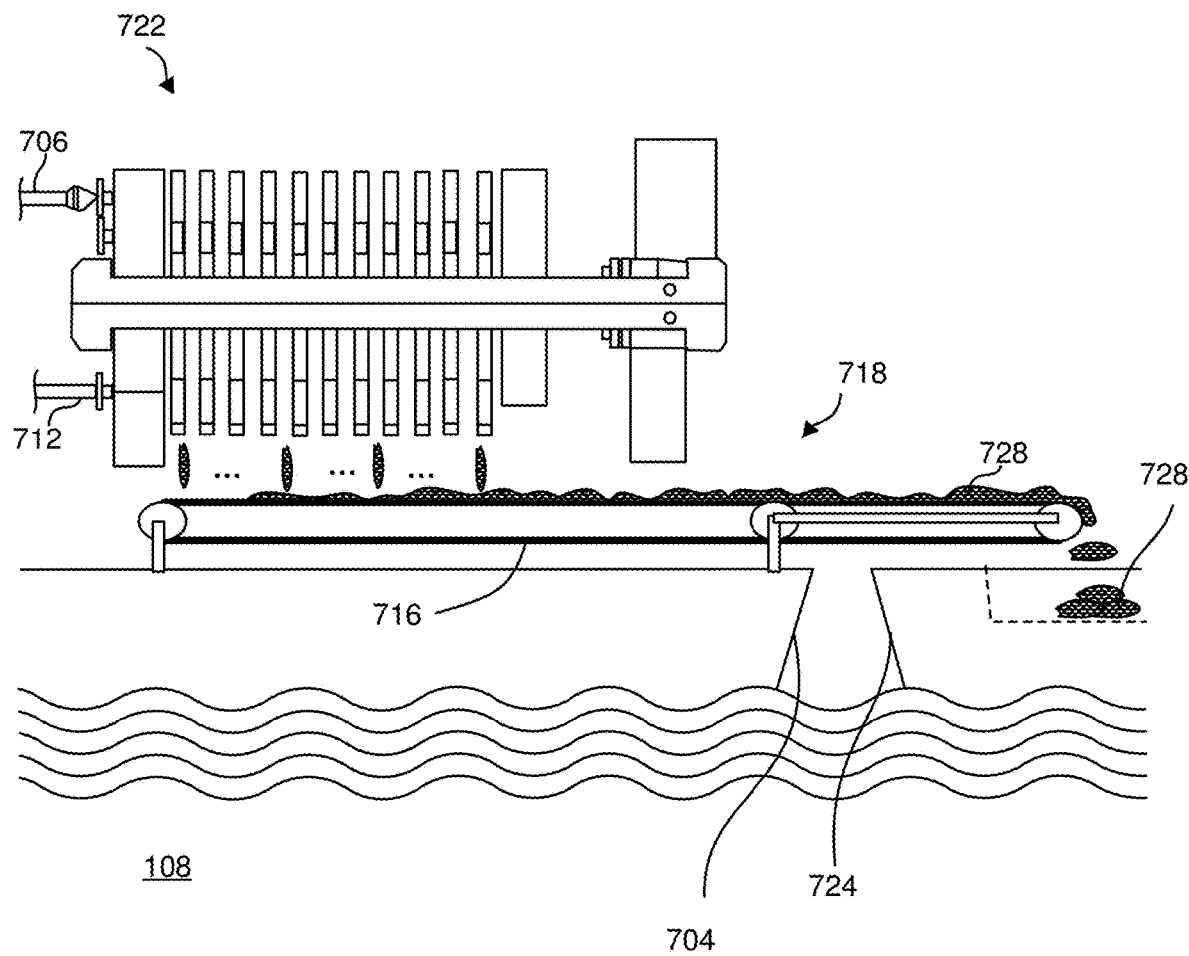
FIG. 8 is a schematic line drawing depicting one embodiment of a separator with one or more filter presses for concentrating microalgae in solid cakes and a conveyor-based transfer system for transferring the cakes from a harvesting vessel to a transfer vessel.

Referring now to FIGS. 7 and 8, FIG. 7 is a schematic line drawing illustrating a different embodiment of a mobile microalgae harvesting apparatus 700 for removing microalgae from a body of water and producing concentrated microalgae (e.g. filtride) in solid cakes 728. FIG. 8 is a schematic line drawing depicting one embodiment of a separator 710 that includes one or more filter presses 723 for concentrating microalgae in solid cakes 728 and a microalgae collector 718 that includes a conveyor 714 (e.g. conveyor belt) for transferring the solid cakes 728 from a harvesting vessel 704 to a transfer vessel 724.

The embodiments depicted in FIGS. 7 and 8 includes an embodiment of a harvesting vessel 704 similar to the harvesting vessel 104 depicted and described above with respect to FIG. 1, with one difference being that a different type of separator 710 (e.g. filter presses 723) separate water from the microalgae mixture 106. Another difference is that the microalgae collector 718 is used to transfer and collect concentrated microalgae in the form of solid cakes 728 rather than in concentrated microalgae 128 in liquid form as described with respect to FIGS. 1, 4-7.

The separator e.g. 710 includes one or more filter assemblies 722 that separate water from concentrated microalgae 128. In one example, the one or more filter assemblies 722 are filter presses 723 that are compressed to press the concentrated microalgae 128 filtrate to form solid cakes 728 (also sometimes referred to as filter cakes). Clean filtered water is discharged from filtrate outputs 715 (sometimes referred to as discharge outputs) of the filter for return to the body of water. In some embodiments, the separator 710 also includes an air compressor that provides compressed air into a drying intake of the filter presses 723 which facilitates the drying and removal of the solid cakes 728 (also referred to as filter cakes) from the filter presses 723. Subsequently, the filter presses 723 are retracted from the pressing position so that the solid cakes 728 may drop out of the filter presses 723 for collection by the microalgae collector 718.

In various embodiments, other filter assemblies 722 using any of various types of filter presses 723 are used to separate water from concentrated microalgae 128. For example, certain screw presses, rotary presses, and belt presses can be suitable alternatives to the plate and frame filter presses depicted in FIG. 8 for producing concentrated microalgae 128 in the form of solid cakes 728 on board at harvesting vessel 704. The solid cakes 728 produced by such presses are suitable for transfer via the conveyor 714.

Likewise, alternative embodiments of separators 110 and filter assemblies 122, such as for example, centrifuges can be used for producing concentrated microalgae 128 in the form of a liquid or slurry that can be transferred by the transfer pumps 120 consistently with the embodiments disclosed above with respect FIG. 1.

As depicted in FIG. 8, in some embodiments, the microalgae collector 718 includes a conveyor 714 that transfers the filtride (e.g. the solid cakes 728 of concentrated microalgae) from the harvesting vessel 704 to the transfer vessel 724 via a conveyor 714. The solid cakes 728 of concentrated microalgae 128 are thereby deposited into a receptacle size to store the concentrated microalgae 128.

In some embodiments, the microalgae collector 728 transfers the concentrated microalgae 128 as solid cakes 728 to the transfer vessel 724 that is coupled to the harvesting vessel 704. Similarly, as described above, the transfer vessel 724 may be mobile i.e., navigable in some embodiments or it may be a stationary transfer vessel as described above. Solid cakes 728 typically have much less water weight than does concentrated microalgae 128 in liquid. Accordingly, in some embodiments, an entire day's worth of solid cakes 728 are harvest and stored in one or more bins underneath the filter presses 728 on the harvesting vessel 704.

Figure 9:
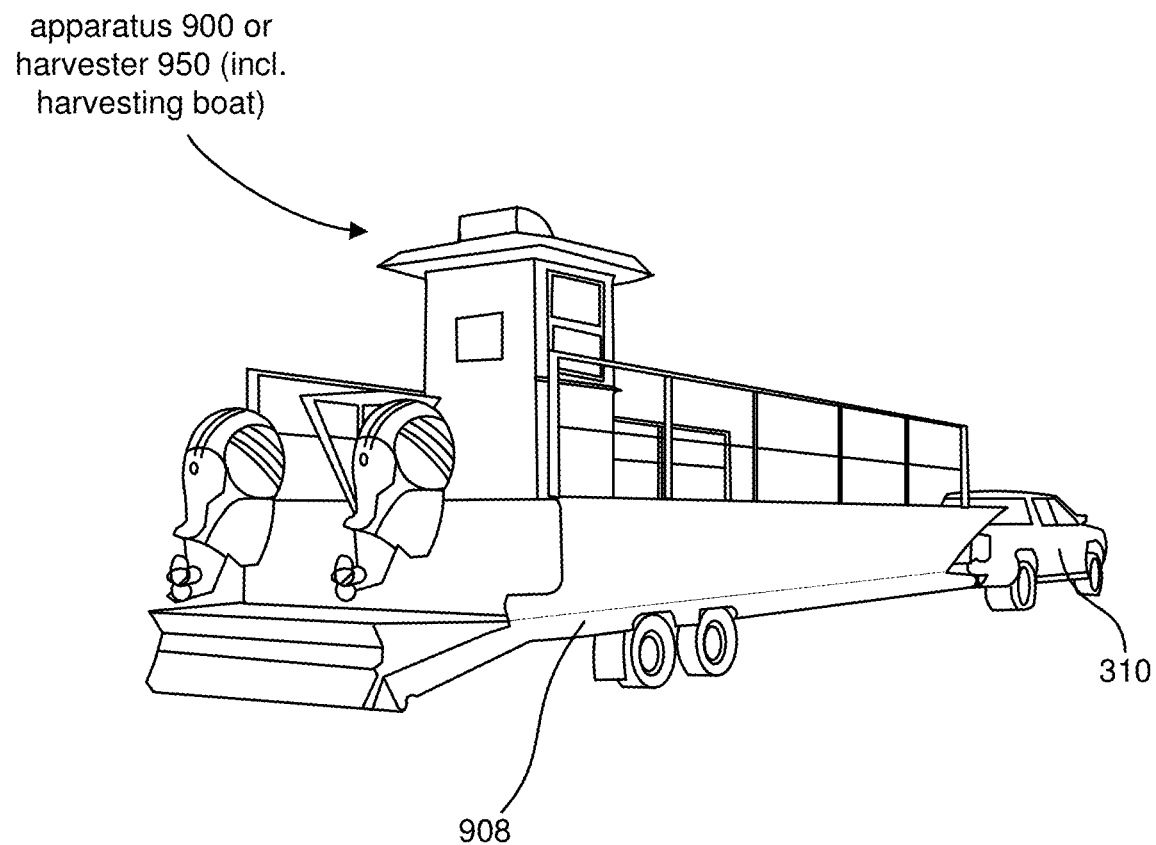
FIG. 9 is a schematic line drawing illustrating one embodiment of mobile land transport for the embodiments the mobile microalgae harvesting apparatuses of FIGS. 1 and 7.

FIG. 9 is a schematic line drawing illustrating one embodiment of a mobile microalgae harvesting apparatus 900 and/or a mobile microalgae harvester 950 that is sized and is sufficiently lightweight so as to be transportable overland to the body of water by a conventional pickup truck 910 pulling a conventional trailer 908. In some examples, the mobile microalgae harvesting apparatus 900 and/or the mobile microalgae harvester 950 are implemented on a vessel such as a self-propelled barge that is about 30 feet long by about 10 feet wide. Such embodiments facilitate rapid and effective deployment of the mobile microalgae harvesting apparatus, harvester, or system to a particular body of water, for example in response to detection of a hazardous algal bloom of microalgae cyanobacteria. In other embodiments, larger barges or other vessels are used and, in some embodiments, such vessel are pulled on trailers by trucks larger than a conventional pickup truck.

The present invention may be embodied in other specific forms without departing from its spirit or essential characteristics. For example, may be noted that the mobile microalgae harvesting apparatus (e.g. 900), the mobile microalgae harvester (e.g. 950) and the system (e.g. 170, 770) for harvesting microalgae may be scaled for use with vessels that are very small or very large without departing from the principles disclosed herein.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mobile microalgae harvesting apparatus comprising:
   a harvesting boom coupled to a harvesting vessel, wherein the harvesting boom skims a microalgae mixture of microalgae and water from a surface of a body of water down to a predetermined depth below the surface;
   a separator aboard the harvesting vessel, the separator comprises a filter press that separates the water from the microalgae mixture, wherein a filtride of the separator comprises one or more solid cakes comprising a mixture of concentrated microalgae and a filter aid; and
   a microalgae collector that collects the filtride from the separator, wherein the microalgae collector deposits the collected the filtride on a transfer vessel coupled to the harvesting vessel.

2. The mobile microalgae harvesting apparatus of claim 1, wherein the harvesting boom is coupled to a front end of the harvesting vessel to skim the microalgae from the body of water at the predetermined depth.

3. The mobile microalgae harvesting apparatus of claim 2, wherein the harvesting boom comprises:
   one or more skimmer sections having an inverted trough shape;
   one or more moveable support levers that couple the intake skimmer boom to the front end of the harvesting vessel; and
   one or more intake ports that couple the one or more skimmer sections to one or more intake pumps disposed on the harvesting vessel.

4. The mobile microalgae harvesting apparatus of claim 3, wherein the harvesting boom further comprises one or more floats coupled to the one or more skimmer sections such that buoyancy of the floats maintains the skimmer sections on the body of water at a predetermined surface depth.

5. The mobile microalgae harvesting apparatus of claim 4 wherein the predetermined surface depth is within an average range of about 0.5 to about 6 inches.

6. The mobile microalgae harvesting apparatus of claim 1, further comprising an air compressor coupled to the filter press to facilitate drying and removal of the one or more solid cakes.

7. The mobile microalgae harvesting apparatus of claim 6, wherein the microalgae collector comprises a conveyor that transfers the filtride from the harvesting vessel to the transfer vessel via a conveyor belt.

8. The mobile microalgae harvesting apparatus of claim 1, wherein one or more of the harvesting vessel and the transfer vessel are sized and sufficiently lightweight so as to be transportable over land to the body of water by a conventional pickup truck pulling a conventional trailer.

9. A mobile microalgae harvester comprising:
   a harvesting boom coupled to a harvesting boat, wherein the harvesting boom skims a microalgae mixture of microalgae and water from a surface of a body of water down to a predetermined depth below the surface;
   a filter aid assembly that combines a combustible filter aid with the microalgae mixture;
   one or more filter assemblies aboard the harvesting boat, each of the one or more filter assemblies comprising a filter press.

10. A system comprising:
    a harvesting vessel configured to float and move on a body of water;
    a harvesting boom coupled to the harvesting vessel, wherein the harvesting boom skims a microalgae mixture of microalgae and water from a surface of the body of water down to a predetermined depth below the surface;
    one or more filter aid assemblies aboard the harvesting vessel that combine the microalgae mixture with a filter aid; and
    one or more filter assemblies comprising a filter press, the filter assemblies configured to receive the microalgae mixture combined with the filter aid and filter the water from the microalgae mixture to produce:
      a filtride suitable for transfer comprising concentrated microalgae combined with the filter aid; and
      a filtrate suitable for discharge to the body of water comprising the filtered water.

11. The system of claim 10, wherein the filter press is selected from a plate and frame filter press, a screw press, a rotary press, and a belt press.

12. The system of claim 10, wherein the filtride comprises one or more solid cakes.

13. The system of claim 10, further comprising a conveyor that conveys the filtride to the transfer vessel.

14. The system of claim 10, wherein the filter press uses compressed air to facilitate drying and removal of the one or more solid cakes.

15. The system of claim 10, wherein the filter aid is selected from a combustible filter aid, a noncombustible filter aid, and a combination thereof.

16. The system of claim 15, wherein filter aid is selected from cellulose, diatomaceous earth, perlite, asbestos; and combinations thereof.

\* \* \* \* \*